United States Patent
Zeppetelle et al.

(10) Patent No.: US 8,325,728 B2
(45) Date of Patent: Dec. 4, 2012

(54) DYNAMIC DATA ROUTING IN A UTILITY COMMUNICATIONS NETWORK

(75) Inventors: Robert Zeppetelle, Brainerd, MN (US); Stanley E. McHann, Jr., Crosslake, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 222 days.

(21) Appl. No.: 12/876,787

(22) Filed: Sep. 7, 2010

(65) Prior Publication Data

US 2012/0057592 A1 Mar. 8, 2012

(51) Int. Cl.
*H04L 12/28* (2006.01)
*H04L 12/56* (2006.01)
*G05B 11/01* (2006.01)
*G08C 19/16* (2006.01)
*G08C 19/12* (2006.01)
*H04M 9/00* (2006.01)

(52) U.S. Cl. .................. 370/390; 340/12.32; 340/13.23; 340/538; 455/402

(58) Field of Classification Search .................. 370/389, 370/390; 340/12.32, 13.23, 538; 455/402
See application file for complete search history.

(56) References Cited

U.S. PATENT DOCUMENTS

| | | | |
|---|---|---|---|
| 2003/0060202 A1* | 3/2003 | Roberts | 455/445 |
| 2003/0224784 A1 | 12/2003 | Hunt et al. | |
| 2005/0017848 A1 | 1/2005 | Flen et al. | |
| 2007/0079366 A1* | 4/2007 | Geffner | 726/12 |
| 2010/0213766 A1 | 8/2010 | Swarztrauber et al. | |

* cited by examiner

*Primary Examiner* — Ronald Abelson
(74) *Attorney, Agent, or Firm* — Crawford Maunu PLLC

(57) ABSTRACT

Methods, systems, and apparatus, including computer programs encoded on a computer storage medium, for. In one aspect, a method includes detecting, by an end point, a first broadcast message specifying a first network identifier for a first PLC network and a first unique substation identifier for a first substation processing unit that belongs to the first PLC network. Data is encoded with the first network identifier and the first unique substation identifier and the encoded first data is transmitted to the first substation processing unit.

21 Claims, 4 Drawing Sheets

DYNAMIC DATA ROUTING IN A UTILITY COMMUNICATIONS NETWORK

BACKGROUND

This specification relates to data communications. Service providers utilize distributed networks to provide services to customers over large geographic areas. For example, communications companies utilize a distributed communications network to provide communications services to customers. Similarly, power companies utilize a network of power lines and meters to provide power to customers throughout a geographic region and receive data back about the power usage.

These service providers are dependent on proper operation of their respective networks to deliver services to the customers and receive data back regarding the services provided. For example, the service provider may want access to daily usage reports to efficiently bill their customers for the resources that are consumed or otherwise utilized by the customers. Therefore, it is important for data specifying resource utilization and other information to be reliably transmitted and/or received at specified intervals.

In power line communication (PLC) networks, end points in the network (e.g., meters, load control switches, remote service switches, and other endpoints) can provide updated information (e.g., power consumption information and/or end point operating status information) by transmitting data over power lines. Generally, each end point is paired with a specific substation processing unit and communicates with the substation processing unit over a designated channel. However, electrical and physical characteristics of a power line communications network vary over time, such that the reliability of data transmission between an end point substation processing unit pair can also vary over time.

For example, a portion of the network may be disabled to perform maintenance or in response to a critical event (e.g., widespread power outage). The time during which that portion of the network is disabled, data will not be transmitted through the disabled portion of the network. The unavailability of the disabled portion of the network can cause problems for service providers because relatively short communications outages (e.g., 40 minutes) can result in loss of data for an entire day. If data can be dynamically routed through multiple available substation processing units, an alternative transmission path can be used when communications through a portion of the network the characteristics of the channels change over time.

SUMMARY

In general, one innovative aspect of the subject matter described in this specification can be embodied in a system that includes a data collector that includes one or more processors configured to receive end point data that is encoded to specify an end point identifier for a particular end point from which the data was transmitted and a network identifier for a PLC network to which the end point belongs; a plurality of substation processing units that are each configured to: transmit a broadcast message specifying the network identifier associated for the PLC network and a unique substation identifier for the substation processing unit, and receive data that is encoded with the network identifier and the unique substation identifier; a plurality of end points, each end point including one or more processors configured to: detect a broadcast message that specifies a network identifier and a unique substation identifier that are broadcast by a substation processing unit, and encode data with a unique end point identifier for the end point, the detected network identifier, and the detected unique substation identifier. Other embodiments of this aspect include corresponding methods, apparatus, and computer programs configured to perform the actions of the methods, encoded on computer storage devices.

These and other embodiments can each optionally include one or more of the following features. Each of the substation processing units can be further configured to transmit the received data to the data collector that is associated with the network identifier for the PLC network. Each of the end points can be further configured to transmit the encoded data to the substation processing unit that is associated with the detected unique substation identifier. At least one of the substation processing units can be further configured to ignore data that are encoded with a different unique substation identifier than the unique substation identifier associated with the PLC network with which the substation processing unit is associated.

Each of the end points can be further configured to detect two or more broadcast messages, each of the broadcast messages specifying a different unique substation identifier and a same network identifier and select a substation identifier for encoding data transmitted by the end point. Each of the end points can be further configured to determine which of the two or more broadcast messages has transmission characteristics that satisfy a selection condition, and select, in response to the determination, the substation identifier specified by the broadcast message having the transmission characteristics that satisfy the selection condition.

The plurality of end points can include at least one power meter. The unique end point identifier for the at least one power meter can be a portion of a serial number that identifies the unique end point. At least one of the substation processing units is further configured to ignore data that are encoded with a different network identifier than the PLC network with which the substation processing unit is associated. At least one of the end points can be further configured to ignore a detected broadcast message that specifies a network identifier that is different than the network identifier with which the at least one of the end points is associated.

Particular embodiments of the subject matter described in this specification can be implemented so as to realize one or more of the following advantages. A self-healing network can be implemented to increase the reliability of network communications. For example, when a portion of the network is disabled, an end point can dynamically select a new substation processing unit to which data can be routed. Thus, even in outage situations, data from the end point can continue to be reported using a different transmission path. This results in a self-healing network that provides more reliable transmission of data through a power line communications network. An end point can be more easily configured by using broadcast messages transmitted by substation processing unit to automatically determine which of several available substation processing units to which the end point will transmit data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Transmission paths (i.e., channels and transmission media/elements over which data are transmitted) are dynamically selected for transmitting data over a utility communications network. The transmission paths are specified by encoding data with unique identifiers that are associated with network elements (e.g., end points, substation processing unit, and other network elements) through which the encoded data are to be transmitted. The unique identifiers with which the data are encoded are selected from broadcast messages that are transmitted by the network elements through which the encoded data can be transmitted. The network elements through which the data are to be transmitted can be selected based on transmission characteristics (e.g., signal amplitudes, signal to noise ratios, or other transmission characteristics) of broadcast messages that are transmitted by the network elements and received by end points (or other network elements) that are encoding and transmitting data over the network.

For example, a particular end point can encode data using the unique identifiers specified by the broadcast message having a highest signal to noise ratio and/or signal amplitude. In turn, the network elements associated with the unique identifiers used to encode the data receive, process, and/or retransmit the encoded data through a PLC and/or radio frequency (RF). The end point can change the transmission path for its data by using different unique identifiers to encode data being transmitted by the end point.

Dynamic Data Routing is described throughout this document with reference to a PLC network. The description that follows is also applicable to performing dynamic data routing among end points that communicate over an RF network (wired or wireless).

Figure 1:
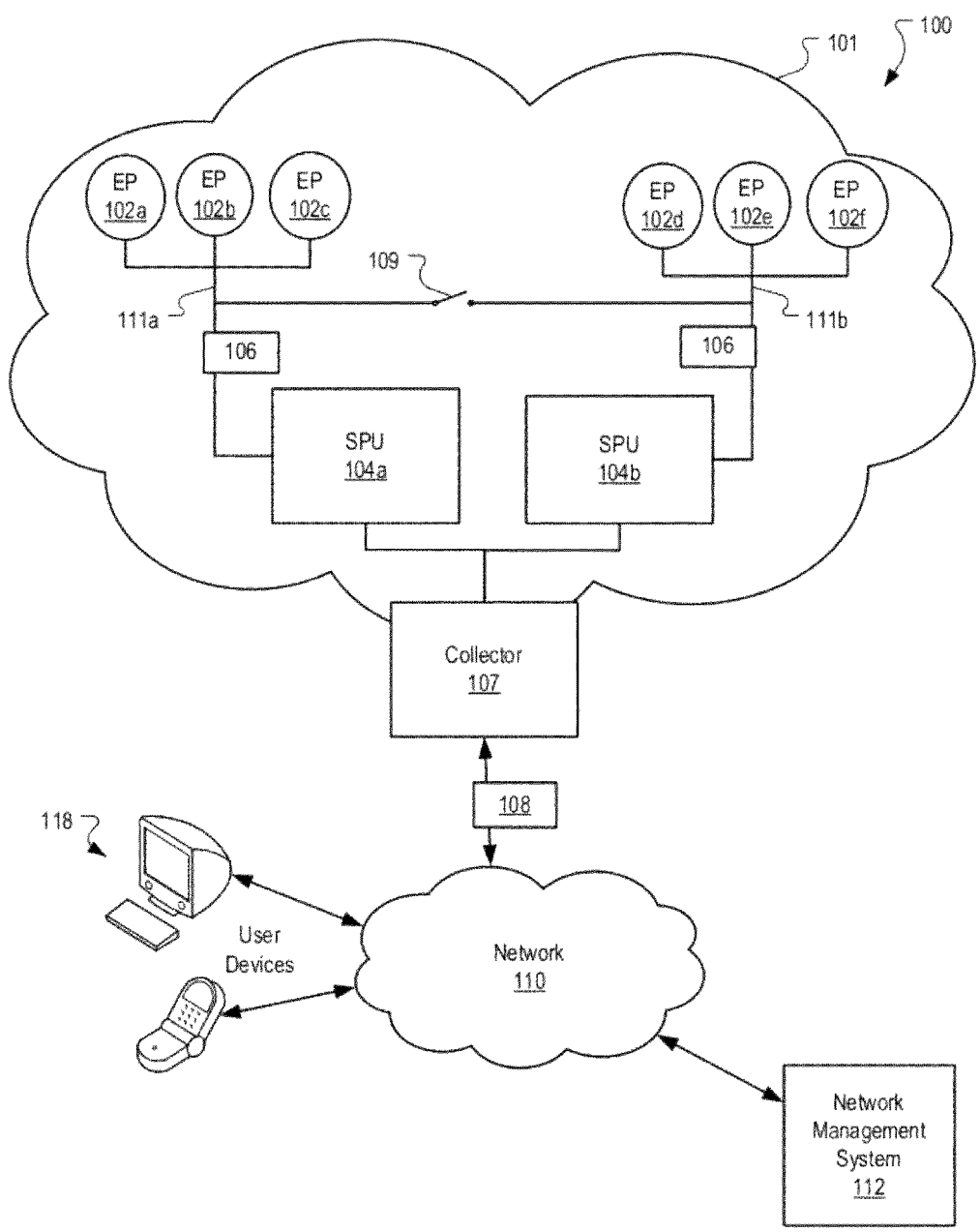
FIG. 1 is a block diagram of an example network environment in which end points transmit data.

FIG. 1 is a block diagram of an example network environment 100 in which end points 102 transmit data. The network environment 100 includes a service network 101 in which a plurality of end points 102 are coupled (e.g., communicatively coupled) to substation processing units 104. The end points 102 can be any device capable of transmitting data in the network environment 100. For example, the end points 102 can be meters in a utility network, computing devices, television set top terminals or telephones that transmit data in the service network 101. The description that follows refers to the end points 102 as power meters in a power distribution network. However, the description that follows is applicable to other types of end points 102 in utility networks or other networks. For example, the description that follows is applicable to gas meters and water meters that are respectively installed in gas and water distribution networks.

The end points 102 can be implemented to monitor and report various operating characteristics of the service network 101. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

The end points 102 report the operating characteristics of the network over communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be implemented in power line communication networks that dynamically allocate available bandwidth according to an orthogonal frequency division multiple access (OFDMA) spectrum allocation technique or another channel allocation technique. (e.g., Time Division Multiple Access, Code Division Multiple Access, and other Frequency Division Multiple Access techniques).

When the end points 102 are implemented as power meters in a power distribution network, the data transmitted by the power meters can represent measures of total power consumption, power consumption over a specified period of time, peak power consumption, instantaneous voltage, peak voltage, minimum voltage and other measures related to power consumption and power management (e.g., load information). Each of the power meters can also transmit status data that specifies a status of the power meter (e.g., operating in a normal operating mode, emergency power mode, or another state such as a recovery state following a power outage).

In some implementations, symbols 106 (i.e., one or more bits) including the data that represent the updated meter information (e.g., data representing measures of power consumption and/or status data) are continuously or intermittently transmitted over a specified unit interval. A unit interval is a period of time over which a particular symbol is transmitted. A unit interval for each symbol transmitted by a power meter can be less than or equal to the time interval (i.e., 1/update rate) at which updated meter information is required to be provided. For example, assume that a particular meter is required to provide updated meter information every 20 minutes (i.e., the specified update rate for the meter). In this example, a meter can transmit a symbol representing a first set of updated meter information for twenty minutes, and then transmit another symbol representing a next set of updated meter information for a subsequent twenty minutes. The update rate and/or unit interval for a meter can be specified by a network administrator based, for example, on types and amounts of updated meter information that are being received from the meter, preferences of a customer (e.g., a power company) to whom the data is being provided, and/or channel characteristics of the channel over which the data is being transmitted.

In FIG. 1, end points 102a-102c and 102d-102f transmit symbols 106 over communications channels to substation processing units 104a, 104b, respectively. A substation processing unit (SPU) 104 is a data processing apparatus that receives communications from end points 102 to manage the service network 101 or for transmission to a collector 107 and/or though a data network 110. For example, a SPU 104 can include a receiver that receives symbols 106 from end points 102 and logs data from the symbols 106. A SPU 104 can also take action based on the data received from the end points 102 and transmit the symbols 106 to a collector 107 and/or a network management system 112 that manages the service network 101. SPUs 104 can transmit the individual symbols 106 or generate a consolidated packet 108 that includes data from multiple symbols 106 received from the end points 102.

The symbols 106 that are received from the end points 102 include data representing updated meter information. The data representing updated meter information can include data representing various operating conditions corresponding to the end point from which the symbol 106 was received as well as power utilization (also referred to as power consumption) and billing information. For example, the symbols 106 can include data reporting monthly, daily, or hourly power usage as measured by a power meter. Similarly, the symbols 106 can include data reporting detection of a power outage and/or power restoration event.

In some implementations, a single SPU 104 can be configured to receive symbols 106 from thousands of end points 102 and transmit the symbols 106 to a collector 107. A collector is a data processing apparatus that receives communications from SPUs 104 and transmits the communications through a data network 110. For example, the collector 107 can receive symbols from the SPUs 104a, 104b and transmit the symbols 106 to a network management system 112 over the data network 110.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only two SPUs 104a, 104b and one collector 107 are shown, the service network 101 can include many different SPUs 104 that can each communicate with thousands of end points 102 and many different collectors 107 that can each communicate with multiple SPUs 104.

In some implementations, the data network 110 couples the collector 107 to the network management system 112. The network management system 112 is a system that monitors and/or controls the service network 101. The network management system 112 can control different characteristics of the service network 101 based on data received from end points 102 that are installed in the service network 101.

For example, in a PLC network, the network management system 112 can receive data indicating that power usage is significantly higher in a particular portion of a power network than in other portions of the power network. Based on this data, the network management system 112 can allocate additional resources to that particular portion of the network (i.e., load balance) or provide data specifying that there is increased power usage in the particular portion of the power network.

The network management system 112 can provide data from the symbols 106 to a user device 118 that can be accessed, for example, by the network operator, maintenance personnel and/or customers. For example, data identifying the increased power usage described above can be provided to a user device 118 accessible by the network operator, who can, in turn, determine an appropriate action regarding the increased usage. Additionally, data identifying a time-of-use measure and/or a peak demand measure can also be provided to the user device 118. Similarly, if there has been a power outage, the network management system 112 can provide data to user devices 118 that are accessible by customers to provide information regarding the existence of the outage and potentially provide information estimating a duration of the outage.

Symbols 106 from a particular end point 102 (e.g., 102a) may be transmitted over one of thousands of transmission paths in a PLC system. Each transmission path can be defined by the channel over which data are being transmitted as well as transmission media (i.e., propagation media and/or devices through which the data are transmitted). For example, a transmission path from a particular end point to a particular substation processing unit can be defined by the particular substation processing unit to which symbols are being transmitted, the propagation medium used to transmit the symbols from the particular end point to the particular substation processing unit, and/or a channel over which the symbols are transmitted.

Each transmission path can have different transmission characteristics (e.g., noise floor, bandwidth) and the transmission path for some end points can be substantially different than that of other end points. For example, one particular transmission path (e.g., a particular channel) in a PLC network may have a noise floor that is 6 dB higher than that of another transmission path in the PLC system. Similarly, one end point 102 can be located substantially further away from a particular SPU (e.g., SPU 104a) than another end point, such that transmissions received at and/or from the end point 102 that is closer to the particular SPU may have a higher amplitude than the symbols received from the other end point 102 that is further away from the particular SPU.

The transmission characteristics of each transmission path over which an end point can transmit symbols (e.g., available paths between an end point and a SPU) can be determined, for example, based on the signal characteristics of signals received by the end point. For example, the signal amplitude, noise floor, and/or signal to noise ratio of signals being received by end points 102 and/or SPUs can be used to determine the transmission characteristics of a particular transmission path.

As described in more detail with reference to FIG. 3, each SPU 104 can transmit a broadcast message that specifies a unique substation identifier for that SPU 104 and/or a network identifier for a network to which the SPU 104 belongs. Each end point 102 that detects the broadcast message and/or belongs to the network specified by the network identifier can determine the transmission characteristics for the transmission path between the end point and the SPU 104 that transmitted the broadcast message. For example, the end point 102 can determine a signal amplitude for the broadcast message, a noise floor for the channel over which the broadcast message was received, and/or a signal to noise measure for the broadcast message. In turn, the end point 102 can store these transmission characteristics in a data store and use the stored characteristics to dynamically select a transmission path over which to transmit symbols. In turn, the end point 102 can encode its symbols with unique identifiers associated with the selected transmission path to route symbols over the selected transmission path.

Transmission characteristics of each individual transmission path can vary over time. As characteristics of the service network 101 change, the signal characteristics (e.g., signal amplitude and signal to noise ratios) of symbols 106 and other data transmitted over the transmission path also change. For example, when a capacitor bank is activated, the amplitudes of signals received at one or more of the SPUs 104a, 104b and/or one or more of the end points 102a-102f can fall because the impedance of the capacitor bank can be lower than that of the SPUs 104a, 104b and/or the end points 102a-102f, respectively. Therefore, more current flows over a transmission path to the capacitor bank than the SPUs 104a, 104b and/or the end points 102a-102f. Transmission characteristics of the transmission paths can also vary over time, for example, due to changes in the environment in which the service network 101 is located (e.g., increased noise from noise sources near components of the network).

Similarly, when a normally open switch 109 is closed, conductors 111a and 111b are connected such that signal characteristics of symbols 106 and other data that are received at the SPU 104 and/or the end points 102 may change. For example, when the switch 109 is closed, the amplitude of signals transmitted by SPU 104b may be higher at end point 102c than the amplitude of signals transmitted by SPU 104a. Assuming that the signals transmitted by SPU 104a and SPU 104b are both output with similar signal characteristics (e.g., output power), the fact that end point 102c receives higher amplitude signals from SPU 104b than SPU 104a may indicate that the transmission path between end point 102c and SPU 104b can provide more reliable symbol transmission than the transmission path between end point 102c and SPU 104a.

Generally, symbols 106 are more reliably recovered when transmitted over a transmission path over which signals are received with higher signal to noise ratios (e.g., a ratio of energy per bit relative to the spectral noise density (Eb/No) than another transmission path over which signals are received with lower signal to noise ratios. For example, assume that following closing of the switch 109, a signal to noise ratio for symbols 106 from end point 102c that are received over the transmission path between end point 102c and SPU 104b becomes higher than the signal to noise ratio for the symbols 106 from end point 102c that are received at SPU 104a. In this example, the reliability with which the symbols 106 from end point 102c can be recovered can be increased by using SPU 104b, instead of SPU 104a, to recover the symbols 106 from end point 102c because it will be more difficult to distinguish the symbols 106 from the noise floor (e.g., the $E_b/N_o$ ratio of the symbols fall below a threshold $E_b/N_o$ ratio) at SPU 104a than at SPU 104b. The $E_b/N_o$ ratio is used throughout this document for example purposes, but other relative measures of signal amplitude, as well as other measures of signal quality can be used.

Because the reliability with which symbols 106 can be recovered varies with the transmission characteristics of transmission paths, the reliability with which symbols are recovered can be increased by monitoring the transmission characteristics of the transmission paths and, in turn, dynamically selecting transmission paths over which the end points 102a-102e communicate with the SPUs 104a, 104b based on the monitored transmission characteristics. Once the transmission path over which symbols are to be transmitted is selected, the transmission path for each symbol can be specified by encoding the symbols with data that specify SPUs 104 and/or other network elements through which the symbol is to be routed.

For example, symbols 106 transmitted by node 102c can be routed through SPU 104b by encoding the symbols 106 from node 102c with a unique substation identifier for SPU 104b. In this example, SPU 104b examines each symbol 106 that it detects and determines whether the symbol is encoded with the unique substation identifier for SPU 104b. Symbols that are encoded with the unique substation identifier for SPU 104b will be processed and/or re-transmitted through the network (e.g., to the collector 107) by SPU 104b. Symbols that are not encoded with the unique substation identifier for SPU 104b will be ignored by SPU 104b. Thus, each end point 102 can specify a particular SPU 104 through which its symbols are transmitted, and each particular SPU 104 can ignore symbols 106 that do not specify that particular SPU 104.

A unique substation identifier is data that uniquely represents a particular substation processing unit. For example, the unique substation identifier for SPU 104b can be a data word (i.e., 1 or more bits) that represents the serial number (or a portion of the serial number) that uniquely identifies SPU 104b. Alternatively, a unique substation identifier for SPU 104b can be a pseudo-random number that is assigned to the SPU 104b, a hash of the serial number for the SPU 104b, a geographic identifier (e.g., latitude/longitude) of the location at which the SPU 104b is installed, or another identifier that can be used to uniquely identify the SPU 104b.

The symbols that are transmitted by an end point 102 can also be encoded with a unique end point identifier for the end point 102. The unique end point identifier is data that uniquely represents the end point that transmitted a symbol. For example, the unique end point identifier for end point 102c can be a data word that represents the serial number (or a portion of the serial number) that uniquely identifies the end point 102c. Alternatively, the unique end point identifier for end point 102c can be a pseudo-random number that is assigned to the end point 102c, a hash of the serial number for the end point 102c, a geographic identifier of the location at which the end point 102c is installed, or another identifier that can be used to uniquely identify the end point 102c. Encoding symbols with the unique end point identifier facilitates identification of the end point 102 that transmitted the symbols.

Symbols 106 transmitted by an end point 102 can further be encoded with a network identifier for a PLC network to which the end point 102 belongs. The network identifier can be, for example, a name of the utility company that operates the PLC network or another identifier selected by an administrator of the PLC network. When a symbol 106 is encoded with a network identifier, SPUs 104, collectors 107, and other network elements that detect the symbols can selectively receive and/or retransmit the symbols 106 in response to determining that the network identifier used to encode the symbol matches the network identifier for the PLC network to which the SPUs 104, collectors 107, and other network elements belong. Thus, the network elements that belong to a first PLC network can ignore symbols that have been transmitted by end points that belong to another PLC network, as described in more detail with reference to FIG. 2.

Network identifiers, end point identifiers, and substation identifiers are several examples of identifiers that can be used to route symbols through a PLC network, but additional identifiers can be used to further define the transmission path over which symbols will be transmitted through the PLC network. For example, symbols can be encoded with collector identifiers that specify a specific collector 107 through which the symbols are to be transmitted. Additional identifiers can be assigned to additional elements of a PLC network and similarly be used to route symbols through the PLC network.

Figure 2:
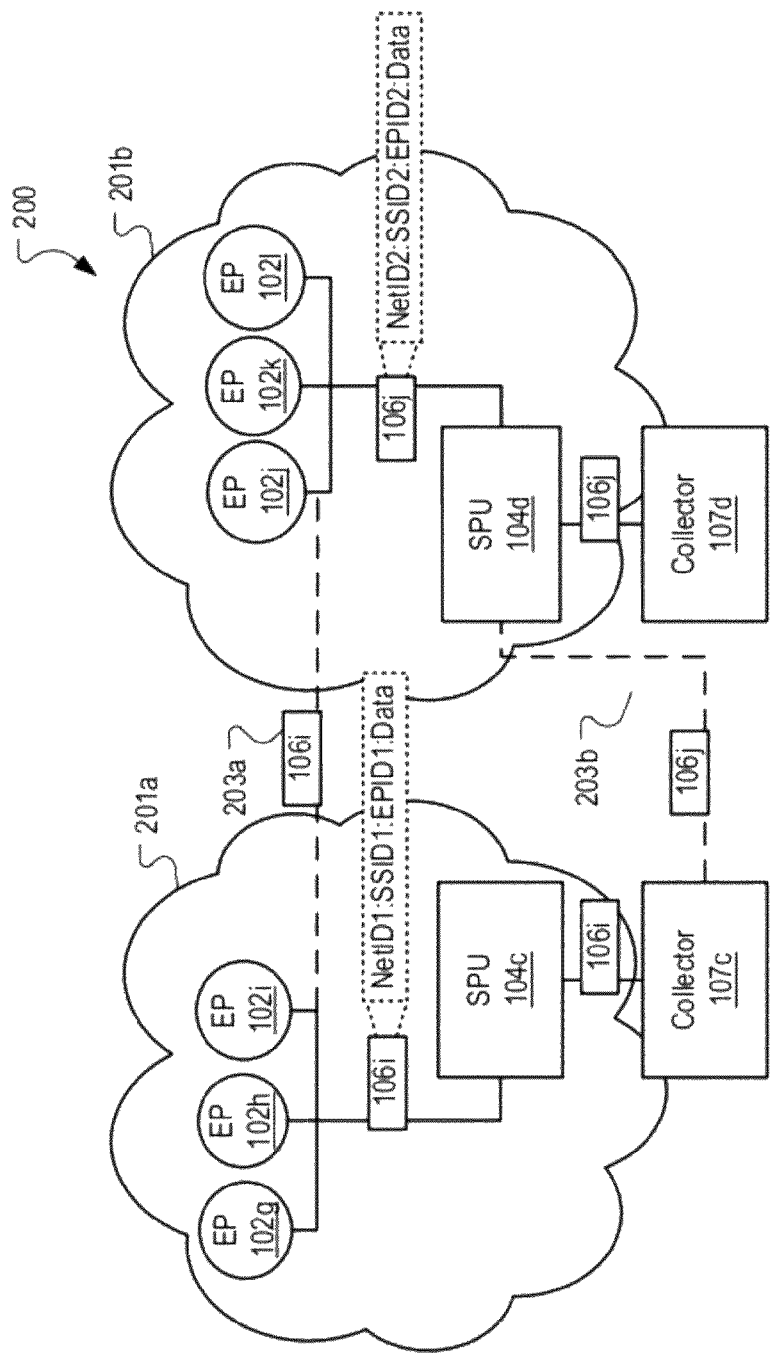
FIG. 2 is a block diagram of an example environment in which symbols are transmitted over two PLC networks.

FIG. 2 is a block diagram of an example environment 200 in which symbols 106 are transmitted over two PLC networks 201a, 201b. PLC network 201a includes three end points 102g-102i, a SPU 104c, and a collector 107c, while the PLC network 201b also includes three end points 102j-102l, a SPU 104d, and a collector 107d. A symbol 106i that was transmitted by end point 102i is shown being transmitted through the PLC network 201a. The symbol 106i is encoded with a network identifier for the PLC network 201a (i.e., NetID1), a substation identifier for the SPU 104c (i.e., SSID1), an end point identifier for the end point 102i (i.e., EPID1), and includes the data being transmitted by the end point 102i. Similarly, the symbol 106j is being transmitted through the PLC network 201b and is encoded with a network identifier for the PLC network 201b (i.e., NetID2), a substation identifier for the SPU 104*d* (i.e., SSID2), an end point identifier for the end point 102*j* (i.e., EPID2), and the data being transmitted by the end point 102*j*.

Assume, for purposes of example, that the PLC networks 201*a* and 201*b* are implemented in adjacent power distribution networks, that symbols transmitted by nodes 102*g*-102*i* are sometimes detected by elements of the PLC network 210*b*, and symbols transmitted by nodes 102*j*-102*l* are sometimes detected by elements of the PLC network 201*a*, as represented by the dashed lines 203*a*, 203*b*. Even though elements from each of the PLC networks 201*a* and 201*b*, sometimes detect symbols from the other PLC network, when the symbols encoding technique described is used, SPU 104*d* will ignore any symbols that are not encoded with the unique substation identifier for SPU 104*d* (i.e., SSID2) and/or the unique network identifier for PLC network 201*b* (i.e., NetID2). Thus, even though the symbol 106*i* from PLC network 201*a* may be detected by the SPU 104*d* in PLC network 201*b*, the symbol 106*i* will not be transmitted to the collector 107*d* and crosstalk between the PLC networks 201*a* and 201*b* is reduced.

When the SPU 104*d* detects the symbol 106*j* it will process this symbol and/or transmit the symbol 106*j* to the collector 107*d* because the symbol 106*j* has been encoded with the unique substation identifier for end point 102*j* (i.e., SSID2) and the network identifier for the PLC network 201*b* (i.e., NetID2). Additionally, the SPU 104*d* and/or the collector 107*d* will be able to determine, based on the end point identifier (i.e., EPID2) that the symbol 106*i* was transmitted by the end point 102*j*, such that the data included in the symbol 106*i* will be properly associated with the end point 102*j*. When the SPU 104*d* transmits the symbol 106*j*, the collector 107*d* will receive and/or process the symbol 106*j* because it is associated with the network identifier for PLC network 201*b* (i.e., NetID2), while the collector 107*c* will ignore the symbol 106*j* if it is detected because the symbol 106*j* is not encoded with the network identifier for the PLC network 201*a* (i.e., NetID1).

As illustrated by the example above, the transmission paths over which symbols are transmitted can be controlled by encoding the symbols with identifiers for the network elements that have been selected to transmit the symbols through the network. In some implementations, the transmission path over which symbols from a particular end point are transmitted can be dynamically selected in response to changes in the transmission characteristics of available transmission paths.

Figure 3:
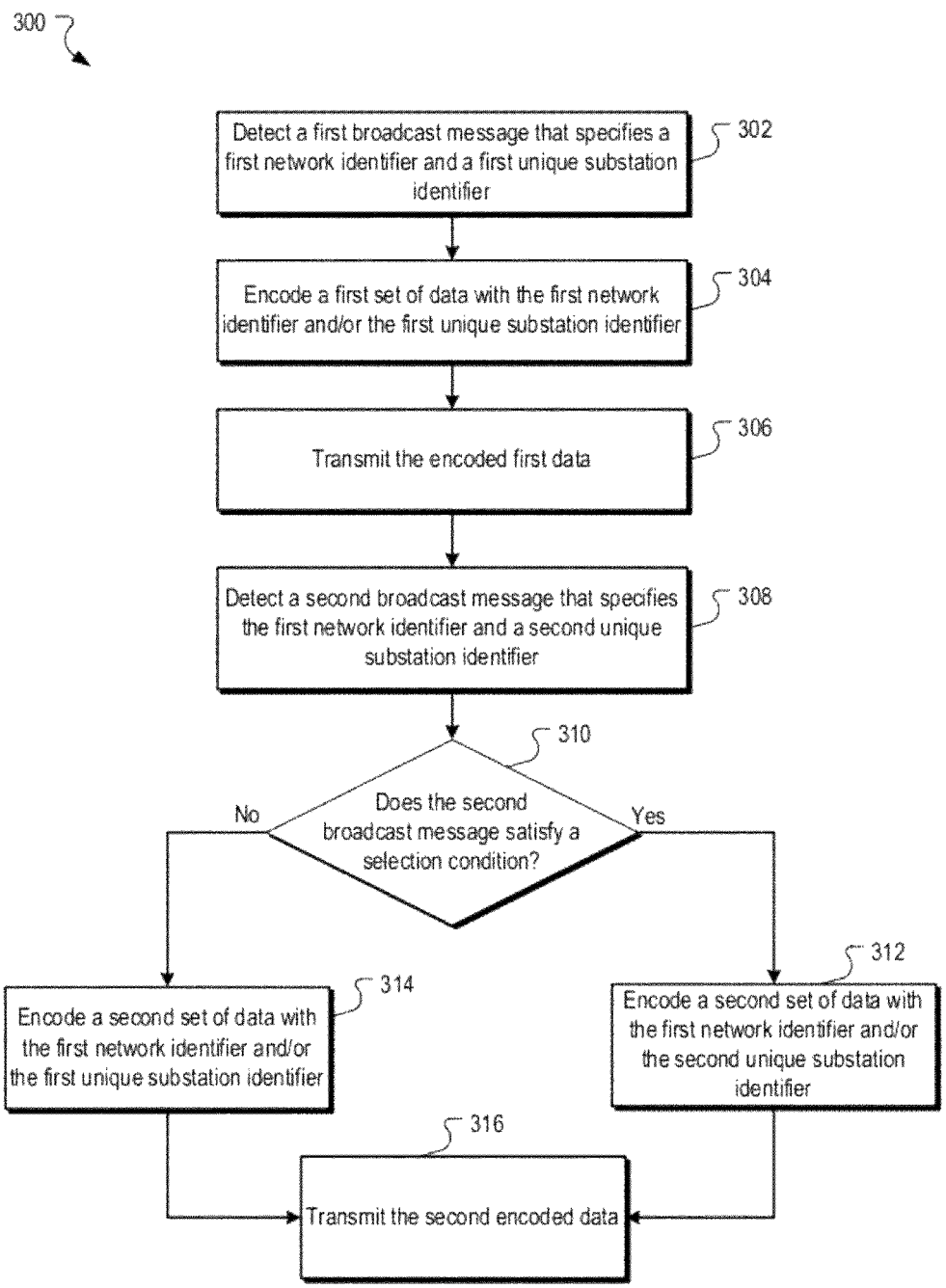
FIG. 3 is an example process for dynamically transmitting data over different transmission paths.

FIG. 3 is an example process 300 for dynamically transmitting data over different transmission paths. The process 300 is a process by which a first set of data is encoded with a first network identifier and a first unique substation identifier in response to detecting a first broadcast message that specifies the identifiers. Following transmission of the first set of encoded data, a second broadcast message is detected, where the second broadcast message specifies the same network identifier as the first broadcast message, but specifies a different unique substation identifier. A determination is made whether the second broadcast message satisfies a selection condition. In response to determining that a selection condition is satisfied by the second broadcast message, a second set of data is encoded with the identifiers specified by the second broadcast message. In response to determining that the selection condition is not satisfied by the second broadcast message, the second set of data is encoded with the identifiers specified by the first broadcast message. Once the second data is encoded, the second encoded data is transmitted.

The process 300 can be implemented, for example, by each of the end points 102 and/or substation processing units 104 of FIG. 1. In some implementations, the end points 102 and/or substation processing units 104 each include one or more processors that are configured to perform actions of the process 300. In other implementations, a computer readable medium can include instructions that when executed by a computer (or another data processing apparatus) cause the end points (or a computer associated with the end points) to perform actions of the process 300.

A first broadcast message is detected (302). A broadcast message is data transmitted by a data processing apparatus that is implemented in a network environment. In some implementations, a broadcast message is data transmitted by a substation processing unit that is configured to receive data from end points in a PLC network. In these implementations, the broadcast message includes data that specify a unique substation identifier for the substation processing unit that transmitted the broadcast message. The broadcast message can also specify a unique network identifier that identifies the PLC network to which the substation processing unit belongs.

The first broadcast message can be detected by an end point (e.g., a utility meter that includes a transceiver) or another element, such as another substation processing unit. When an end point and/or substation processing unit that belong to a same PLC network as the network specified by the unique network identifier detect the broadcast message, transmission characteristics associated with the broadcast message can be determined. For example, the signal amplitude, noise floor, and signal to noise ratio for the broadcast message can be determined In turn, the end point and/or substation processing unit that detected the broadcast message can store the transmission characteristics and the substation identifier and/or network identifier in a data store. In some implementations, the transmission characteristics for a broadcast message are indexed according to the unique substation identifier that was specified by the broadcast message.

When the first broadcast message is the only broadcast message that has been detected by a particular end point (or substation processing unit) and/or the first broadcast message satisfies a selection condition, as described below, a first set of data is encoded with the unique substation identifier and/or the unique network identifier specified by the first broadcast message (304). In some implementations, the data being encoded are updated meter information that specify measures of total power consumption, power consumption over a specified period of time, peak power consumption, instantaneous voltage, peak voltage, minimum voltage and other measures related to power consumption and power management.

The first set of data can be encoded with unique identifiers by transmitting the first set of data in a symbol with the unique identifiers. For example, one or more bits that represent the unique identifiers can be inserted as a header and/or footer of a symbol that includes updated meter information being reported by a meter over a power line communications network.

Once the first set of data has been encoded with one or more identifiers, the encoded first data is transmitted through the network (306). As described with reference to FIG. 1, the data can be transmitted, for example, over a channel of a power line communications network. The channel over which the data is transmitted can be selected from a set of channels over which the end point and a target substation processing unit (i.e., a substation processing unit having a unique substation identifier matching the unique substation identifier used to encode the data) are configured to communicate.

A second broadcast message is detected (308). In some implementations, the second broadcast message includes data that specify the first network identifier and a second unique substation identifier for another substation processing unit. For example, the second broadcast message can be transmitted by a substation processing unit different from the substation processing unit that transmitted the first broadcast message, but that belongs to the same PLC network as the substation processing unit that transmitted the first broadcast message.

The second broadcast message can be detected by an end point (e.g., a utility meter that includes a transceiver) or another element, such as another substation processing unit.

When an end point and/or substation processing unit that belong to a same PLC network as the network specified by the unique network identifier detect the broadcast message, transmission characteristics associated with the broadcast message can be determined. For example, the signal amplitude, noise floor, and signal to noise ratio for the broadcast message can be determined In turn, the end point and/or substation processing unit that detected the broadcast message can store the transmission characteristics and the substation identifier and/or network identifier in a data store.

A determination is made whether the second broadcast message satisfies a selection condition (310). The selection condition is a condition that when satisfied by a broadcast message causes unique identifiers (e.g., substation identifiers, network identifiers, and other identifiers) specified by the broadcast message to be used to encode data. In some implementations, the selection condition specifies minimum transmission characteristics that satisfy the selection condition. For example, the selection condition can specify that a broadcast message having at least a minimum threshold signal amplitude and/or at least a minimum threshold signal to noise ratio (e.g., a threshold Eb/No) satisfies the selection condition. The minimum threshold signal amplitude and/or minimum threshold signal to noise ratio can be specified as absolute minimum value or a relative minimum value.

In some implementations the selection condition specifies that the broadcast message having a highest signal to noise ratio and/or highest signal amplitude satisfies the selection condition. In these implementations, the determination of whether the second broadcast message satisfies the selection condition can be made by comparing the signal to noise ratio and/or the signal amplitude associated with the second broadcast message with signal to noise ratios and/or signal amplitudes associated with other broadcast messages that have been detected.

When the second broadcast message satisfies the selection condition, a second set of data is encoded with the first unique network identifier and/or the second unique substation identifier (312). For example, one or more bits that represent the unique identifiers can be inserted as a header and/or footer of a symbol that includes updated meter information being reported by a meter over a power line communications network. When the second broadcast message does not satisfy the selection condition, the second set of data is encoded with the first network identifier and/or the first unique substation identifier specified by the first broadcast message, as described above (314).

Once the second data has been encoded, the second encoded data is transmitted (316). As described above, the data can be transmitted, for example, over a channel over which the end point and a target substation processing unit (i.e., a substation processing unit having a unique substation identifier matching the unique substation identifier used to encode the data) are configured to communicate.

In some implementations, the second broadcast message is detected after a time at which transmission of the encoded first set of data occurred (i.e., following encoding and transmission of the first set of data). For example, prior to encoding and transmitting the first set of data, an end point may have only detected the first broadcast message. In this situation, the identifiers specified by the first broadcast message will be used to encode the first set of data, as described above.

In some implementations, the second message can also be detected prior to transmission and/or encoding of the first set of data. If the second broadcast message is detected prior to encoding and transmitting the first set of data, a determination can be made whether the first broadcast message or the second broadcast message satisfies the broadcast condition. For example, a determination can be made as to which of the first broadcast message and the second broadcast message is associated with a highest signal to noise ratio and/or signal amplitude. In response to determining that the first broadcast message satisfies the selection condition, the identifiers specified by the first broadcast message are used to encode the first set of data. In response to determining that the second broadcast message satisfies the selection condition, the identifiers specified by the second broadcast message are used to encode the first set of data.

Figure 4:
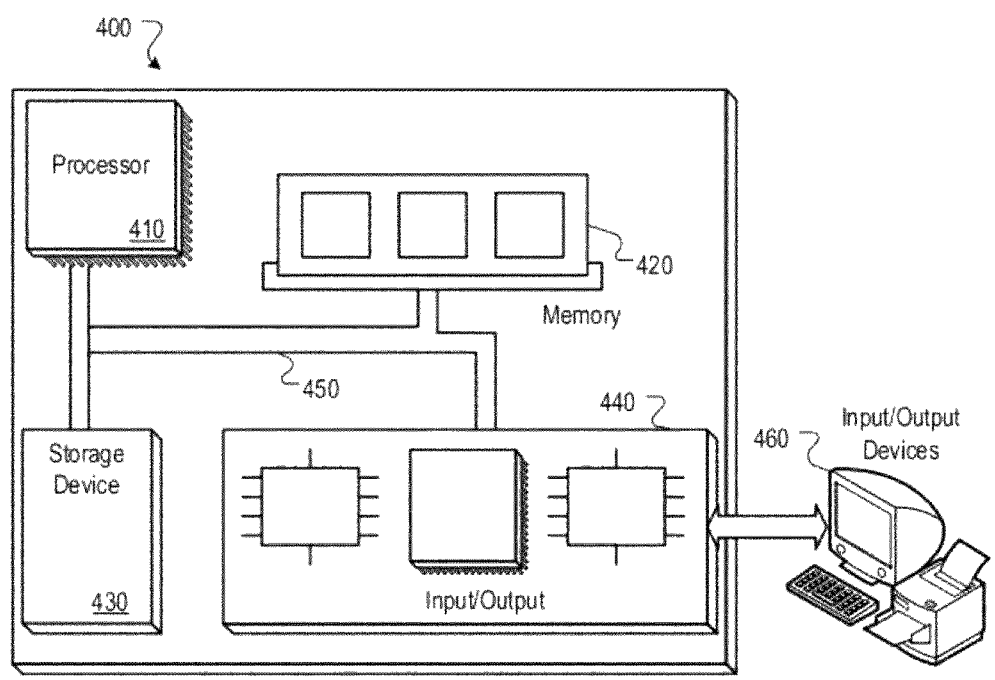
FIG. 4 is a block diagram of an example system that can be used to facilitate dynamic transmission path selection.

In some implementations, a set of data can be encoded with two or more unique identifiers for two or more different substation processing units (or other network elements), such that the symbol containing the set of data and the two or more unique identifiers will be received by the two or more different substation processing units. Transmitting data in this manner provides data redundancy so that if communications in a one portion of the network fail, the data can be recovered from a substation processing unit in another portion of the network. FIG. 4 is a block diagram of an example processing system 400 that can be used to facilitate dynamic transmission path selection. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The computing system can include clients and servers. A client and server are generally remote from each other and typically interact through a communication network. The relationship of client and server arises by virtue of computer programs running on the respective computers and having a client-server relationship to each other. In some embodiments, a server transmits data to a client device. Data generated at the client device can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A power line communications system, comprising:
    a data collector that includes one or more processors configured to receive end point data that is encoded to specify an end point identifier for a particular end point from which the data was transmitted and a network identifier for a PLC network to which the end point belongs;
    a plurality of substation processing units that are each configured to:
        transmit a broadcast message specifying the network identifier associated for the PLC network and a unique substation identifier for the substation processing unit, and
        receive data that is encoded with the network identifier and the unique substation identifier;
    a plurality of end points, each end point including one or more processors configured to:
        detect a broadcast message that specifies a network identifier and a unique substation identifier that are broadcast by a substation processing unit, and
        encode data with a unique end point identifier for the end point, the detected network identifier, and the detected unique substation identifier.

2. The system of claim 1, wherein each of the substation processing units are further configured to transmit the received data to the data collector that is associated with the network identifier for the PLC network.

3. The system of claim 1, wherein each of the end points are further configured to transmit the encoded data to the substation processing unit that is associated with the detected unique substation identifier.

4. The system of claim 1, wherein at least one of the substation processing units is further configured to ignore data that are encoded with a different unique substation identifier than the unique substation identifier associated with the PLC network with which the substation processing unit is associated.

5. The system of claim 1, wherein each of the end points is further configured to:
    detect two or more broadcast messages, each of the broadcast messages specifying a different unique substation identifier and a same network identifier, and
    select a substation identifier for encoding data transmitted by the end point.

6. The system of claim 5, wherein each of the end points is further configured to:
    determine which of the two or more broadcast messages has transmission characteristics that satisfy a selection condition, and
    select, in response to the determination, the substation identifier specified by the broadcast message having the transmission characteristics that satisfy the selection condition.

7. The system of claim 6, wherein each of the end points is further configured to determine a broadcast message having a highest signal to noise ratio is the broadcast message having transmission characteristics that satisfy the selection condition.

8. The system of claim 1, wherein the plurality of end points includes at least one power meter.

9. The system of claim 8, wherein the unique end point identifier for the at least one power meter is a portion of a serial number that identifies the unique end point.

10. The system of claim 1, wherein at least one of the substation processing units is further configured to ignore data that are encoded with a different network identifier than the PLC network with which the substation processing unit is associated.

11. The system of claim 1, wherein at least one of the end points is further configured to ignore a detected broadcast message that specifies a network identifier that is different than the network identifier with which the at least one of the end points is associated.

12. A method performed by data processing apparatus, the method comprising:
    detecting, by an end point, a first broadcast message specifying a first network identifier for a first PLC network and a first unique substation identifier for a first substation processing unit that belongs to the first PLC network;
    encoding first data with the first network identifier and the first unique substation identifier;
    transmitting the encoded first data to the first substation processing unit.

13. The method of claim 12, further comprising:
    detecting a second broadcast message specifying the first network identifier and a second unique substation identifier for a second substation processing unit that is part of the first PLC network; and
    determining that the first broadcast message has transmission characteristics that satisfy a selection condition.

14. The method of claim 13, wherein determining that the first broadcast message has transmission characteristics that satisfy a selection condition comprises determining that a signal to noise ratio for the first broadcast message is greater than the signal to noise ratio for the second broadcast message.

15. The method of claim 13, wherein determining that the first broadcast message has transmission characteristics that satisfy a selection condition comprises determining that a signal amplitude for the first broadcast message is greater than the signal amplitude for the second broadcast message.

16. The method of claim 12, further comprising:
   detecting a second broadcast message specifying the first network identifier and a second unique substation identifier for a second substation processing unit that is part of the first PLC network;
   determining that the second broadcast message has transmission characteristics that satisfy a selection condition;
   encoding second data with the first network identifier and the second unique substation identifier; and
   transmitting the encoded second data to the second substation processing unit.

17. The method of claim 16, wherein determining that the second broadcast message has transmission characteristics that satisfy a selection condition comprises determining that the second broadcast message has a signal to noise ratio that is greater than the signal to noise ratio for the first broadcast message.

18. The method of claim 16, wherein determining that the second broadcast message has transmission characteristics that satisfy a selection condition comprises determining that the second broadcast message has a signal amplitude that is greater than the signal amplitude for the first broadcast message.

19. The method of claim 16, wherein:
   detecting a first broadcast message comprises detecting, at a first time, the first broadcast message, and
   detecting a second broadcast message comprises detecting, at a second time, the second broadcast message, the second time being after a time at which transmission of the encoded first data has occurred.

20. A computer storage medium encoded with a computer program, the program comprising instructions that when executed by data processing apparatus cause the data processing apparatus to perform operations comprising:
   detecting, by an end point, a first broadcast message specifying a first network identifier for a first PLC network and a first unique substation identifier for a first substation processing unit that is part of the first PLC network;
   encoding first data with the first network identifier and the first unique substation identifier;
   transmitting the encoded first data to the first substation processing unit.

21. The program of claim 20, further comprising instructions that when executed cause the data processing apparatus to perform operations further comprising:
   detecting a second broadcast message specifying the first network identifier and a second unique substation identifier for a second substation processing unit that is part of the first PLC network;
   determining that the second broadcast message has transmission characteristics that satisfy a selection condition;
   encoding second data with the first network identifier and the second unique substation identifier; and
   transmitting the encoded second data to the second substation processing unit.

\* \* \* \* \*